Oct. 27, 1964  E. H. YONKERS ETAL  3,154,718
SECONDARY LIGHTNING ARRESTER WITH ARC SPINNING MEANS
Filed March 16, 1962

INVENTORS.
EDWARD H. YONKERS
BY RONALD F. HUBER
ATTORNEYS

United States Patent Office 3,154,718
Patented Oct. 27, 1964

3,154,718
SECONDARY LIGHTNING ARRESTER WITH ARC SPINNING MEANS
Edward H. Yonkers, Glencoe, and Ronald F. Huber, Evanston, Ill., assignors to Joslyn Mfg. and Supply Co., Chicago, Ill., a corporation of Illinois
Filed Mar. 16, 1962, Ser. No. 180,186
15 Claims. (Cl. 315—58)

The present invention relates generally to a lightning arrester and is more particularly concerned with a new and improved protective device generally known as a secondary lightning arrester for use on a secondary or low voltage circuit.

Secondary lightning arresters are used to protect equipment connected to the low voltage, secondary circuits and power distribution systems which usually have their primary or high voltage circuit also protected by lightning arresters or similar devices.

The present invention is concerned with the improved protection of the secondary circuits of this system and, more particularly, with the protection of low voltage electrical equipment where it is directly or indirectly exposed to lightning voltages. Such secondary voltages in common use in this country include those in the 125- to 650-volt range of phase-to-ground and phase-to-phase voltages, and on four wire, three-phase multigrounded systems up to about 900 volts phase-to-phase.

It has been found that much of the low voltage equipment used on the secondary systems cannot be adequately protected by secondary arresters of prior designs for several reasons. Among these reasons are the size or bulk of secondary arresters which inhibit their installation in the very small space generally available in the equipment to be protected; the high cost of manufacture; the excessive gas blast and the direction of this blast into areas of the equipment where it will damage component elements; the high impulse level which results in inadequate protection of low voltage equipment; the excessive follow current drawn which may result in smoking up of the interior of the equipment and in damage to the parts thereof; and the fact that many of the prior secondary arresters are designed for use in multiphase systems whereas the equipments to be protected by the arrester of the present invention are often used in single phase systems.

As is well known, the function of a lightning arrester is to provide a low resistance path to ground in order to prevent the occurrence of excessive voltages caused by electrical disturbances and, at the same time, to present a relatively high resistance under normal operating conditions so that the diversion of power current from the line is insignificant. An ideal lightning arrester would switch from its low resistance condition to its high resistance condition as soon as the abnormal surge has been dissipated, thus limiting the flow of power follow current to the period actually required to restore the system to normal operation. To perform these functions a lightning arrester consists of a characteristic element connected in series with one or more isolating gaps which function to keep the major portion of the normal system voltage off on the valve element in the absence of surges. The characteristic element serves to bypass to ground surge current resulting from abnormal line voltages and to interrupt the flow of system follow current as soon as the abnormal voltage condition has been dissipated. Known valve type arresters employ a nonlinear resistance or valving material which has a high resistance for voltages of the order of the system voltage and has a very low resistance for voltages in excess of the normal system voltage. Frequent surges through the valve element will tend to deteriorate the element by fusing the valve material together. Consequently, in order to prolong the life of the lightning arrester, it is necessary to minimize deterioration of the valve material. This problem is particularly difficult when the lightning arrester is small in size and very compact since a minimum of valve material may be used. Accordingly, it is desirable to obtain maximum use of the small amount of valve material which may be inserted in a compact size lightning arrester.

Moreover, difficulty has been experienced in the destruction of the lightning arrester by flashover along the outside wall thereof between the terminals of the arrester at different electrical potentials. This is especially true when the outside of the arrester is exposed to deleterious atmospheric conditions such as oils and the like. Additionally, whenever a lightning arrester is made smaller and more compact, the voltage gradient along the outside surface is generally increased so that the tendency to flashover is increased.

It is therefore an object of the present invention to provide a lightning arrester which avoids all of the aforementioned disadvantages of prior secondary arresters.

A further object of the present invention is to provide an improved secondary lightning arrester which is small in size and very compact.

A further object of the present invention is to provide an improved secondary lightning arrester which is economical to manufacture.

A further object of the present invention is to provide an improved secondary lightning arrester which is very effective for its small size and low cost.

It is a further object of the present invention to provide an improved lightning arrester obtaining maximum utilization of the valve material therein.

A further object of the present invention is to provide a new and improved lightning arrester of compact size having improved sparkover characteristics.

The foregoing and other objects of the invention are realized by the provision of a secondary lightning arrester or protective device, small in size, and having an isolating gap and valve material and wherein the spark in the isolating gap is controlled by magnetic means to provide continuous motion to an arc in the gap. Valve materials are well known, and the improved valve material disclosed and claimed in the copending application of Edward H. Yonkers (Case J-49-Cont.), Serial No. 157,293, filed November 16, 1961, and assigned to the same assignee as the present invention, is particularly suited for use with the present arrester. Additionally, the lightning arrester according to the present invention includes an isolating spark gap formed of a first electrode of inverted cup-shape having its exterior in engagement with the valve material and a second electrode concentrically spaced within the first electrode to form the spark gap therewith. Magnetic means are provided producing an axial magnetic field through the gap. The spark gap and the valve material are serially connected across an electric path to provide for the discharge of an abnormally high voltage across the path. Of course, it is understood that normally the second electrode is connected to one line of a single or multiphase electrical system and the valve material is connected through the casing of the arrester to ground.

The invention, together with further objects and advantages thereof, will best be understood by reference to the following detailed description taken in connection with the accompanying drawing, in which.

Figure 1:
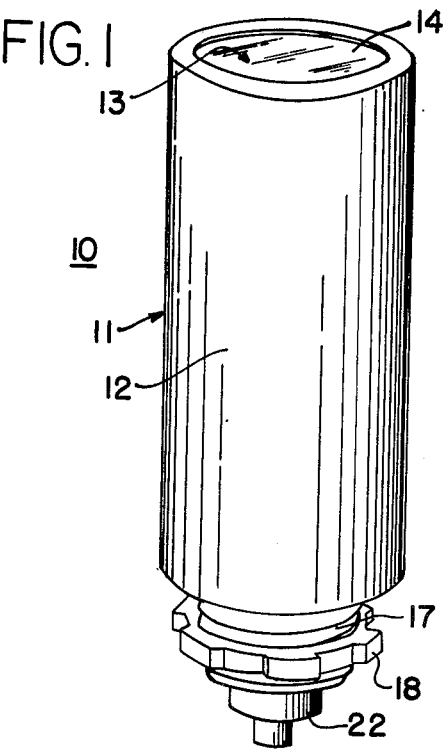
FIG. 1 is a perspective view of an improved lightning arrester according to the present invention.
Figure 2:
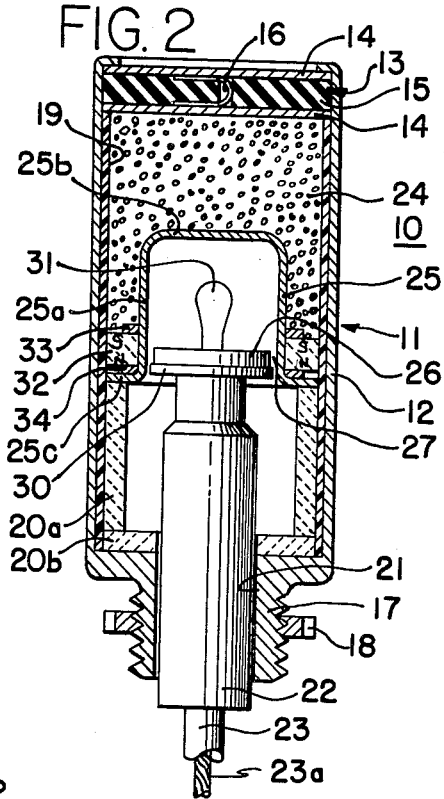
FIG. 2 is a cross-sectional, elevational view of the improved lightning arrester of FIG. 1.

Referring now to the embodiment of FIGS. 1 and 2, the improved lightning arrester, generally illustrated at 10, includes an outer housing or casing 11 formed of a cylindrical side wall 12 of aluminum or other electrically conductive material and closed at one end by an end wall 13 formed of a pair of spaced discs 14 of aluminum or other electrically conductive material and separated by a resilient gasket 15 of neoprene or other suitable material. An electrically conductive shunt 16 of suitable material such as copper interconnects the spaced discs 14. The other end of the casing 11 contains a threaded mounting flange 17 formed integral with the side wall 12 and provided with a mating lock nut 18. The electrical components of the lightning arrester 10 are enclosed within the casing 11 and the mounting flange 17 is provided with an axially extending central aperture 21 through which is positioned an electrical insulator 22 of phenolic resin or other suitable material. An insulated electrical lead 23 including a conductor 23a passes axially through the insulator 22. A cylindrical inner liner 19 of electrically insulating material such as of phenolic resin is positioned completely throughout the length of the side wall 12 to insulate the components within the lightning arrester 10 from direct engagement with the conductive side wall 12. Moreover, a plurality of electrical insulators 20a and 20b are provided for maintaining the components of the lightning arrester in proper spaced relation.

To provide a characteristic element for control of low voltage discharge through the lightning arrester, the lightning arrester 10 contains a suitable valve material 24. The valve material 24 may comprise silicon carbide particles, as more fully set forth in the above-mentioned copending application of Yonkers. The valve material 24 is contained in the casing 11 and fills the end of the lightning arrester 10 closed by the end wall 13.

To provide for a spark discharge under abnormally high voltage conditions, the lightning arrester to is provided with a cup-shaped first electrode 25 of bronze or other suitable electrically conductive material which cooperates with a disc-shaped arcing or second electrode 26 of bronze or other suitable electrically conductive material concentrically positioned within a cylindrical side wall portion 25a of the first electrode 25, to form an annular spark gap 27 therebetween. The electrode 25 additionally includes a bottom or end wall 25b closing one end thereof and is provided adjacent its other end with an outwardly extending ring-shaped portion 25c. The electrode 25 is inverted into the valve material 24 to form electrical contact therewith and the outer surface of the side wall portion 25a and the end wall 25b is in engagement with the valve material 24 to form conductive paths therewith.

The electrode 26 is supported on the inner end of the insulator 22 by an insulating washer 30 and is connected to the inner end of the electrical conductor 23a. A crimped copper rivet 31 secures the inner end of the electrical conductor 23a to the electrode 25.

In order to provide for control of the motion of an arc within the spark gap 27, there is provided magnetic means in the form of a ceramic permanent magnet 32 concentrically positioned around the spark gap 27 and provided with axially extending north and south poles. Ring- or washer-shaped ferrous pole shoes 33 and 34 cooperating with the magnet 32 to concentrate the magnetic field and direct it axailly through the spark gap 27.

From the above-detailed description of the improved lightning arrester, its operation is believed clear; however, briefly, it will be appreciated that an abnormally high voltage to the lead 23 will provide an arc discharge across the spark gap 27. As the spark passes through the gap 27 at right angles to the magnetic field induced by a magnet 32, the field causes motor action on the arc current spinning the arc around the annular gap. The arc travels so rapidly around the electrode surfaces that the electrode surfaces do not reach the melting point. As a result, electrode beading is minimized and the arc is cooled and deionized and extinction thereof occurs at the first 60-cycle current zero. Moreover, the inverted derby hat construction of the electrode 25 which contacts the valve material 24 provides for large surface contact between the electrode 25 and the valve material 24 so that the relatively small amount of valve material provided may be fully utilized. The large contact surface tends to form a multitude of electrical channels through the valve material 24 so that the current will be distributed into the central area of the valve material 24. Moreover, the comparatively long outer side wall provided by the casing 11 minimizes the flashover along the surface of the device. Accordingly, the lightning arrester 10 which is very effective for its size and cost is provided.

Figure 3:
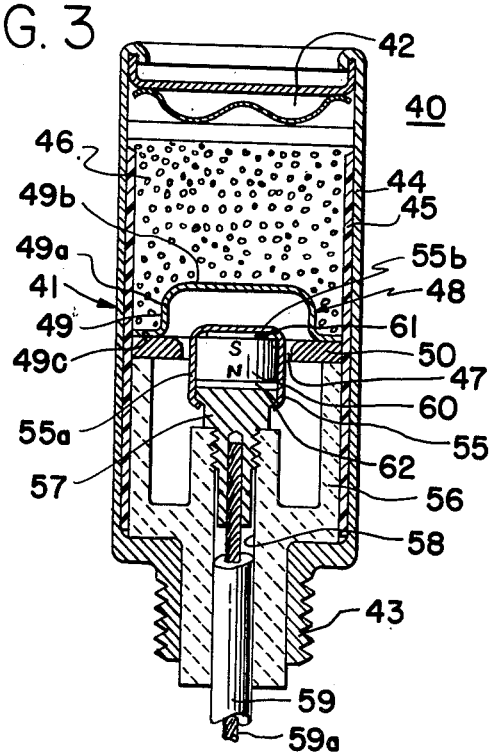
FIG. 3 is a cross-sectional, elevational view of a modified embodiment of a lightning arrester according to the present invention.

Referring now to the embodiment of FIG. 3, there is illustrated a modified form of lightning arrester 40 according to the present invention. As therein illustrated, the lightning arrester 40 includes a casing 42 of aluminum or other electrically conductive material having one end closed by an end wall 42 and further provided with a threaded mounting flange 43 at the other end thereof. The casing 41 includes a cylindrical side wall 44 of aluminum or other suitable electrically conductive material. Additionally, the casing 41 is provided with a cylindrical inner sleeve 45 of electrically insulating material such as phenolic resin.

To provide for the extinction of low voltage flows, the ligtning arrester 40 is provided with a valve material 46 filling the closed end thereof and formed of silicon carbide as more fully described in the above-mentioned copending application filed by Yonkers or with other suitable valve material.

To provide a spark gap 47 to provide a high resistance impedance to the low voltage line circuit, there is provided a first electrode assembly 48 of generally inverted derby hat or cup shape and including a cylindrical side portion 48 formed of copper or other suitable electrically conductive material. The first electrode 48 includes a first member 49 having a cylindrical side wall portion 49a closed at one end by an end wall 49b and provided adjacent its other end with an outwardly extending ring-shaped flange 49c. Additionally, the first electrode 48 includes a ring- or torus-shaped electrode member 50 electrically connected to the flange 49b. A second electrode 55 is provided concentrically positioned with the first electrode 48 and supported from an insulating member 56 within the casing 41. The second electrode 55 is of hollow cylindrical shape forming a disc-shaped member having a cylindrical side wall 55a closed at one end by an end wall 55b and open at its other end to receive a stud 57 extending through an axial opening 58 in the insulating member 56. An electrical conductor 59a of an electrical lead 59 extends through the opening 58 and is electrically secured with the stud 57.

To provide for the control of the movement of an arc in the spark gap 47, magnetic means comprising a ceramic permanent magnet 60 is positioned within the hollow electrode 55 concentric with the electrodes 48 and 55 and having axially extending poles to provide a general axial magnetic field through the spark gap 47. A pair of disc-shaped pole shoes 61 and 62 positioned against opposite ends of the magnet 60 concentrate the magnetic field and direct it axially through the spark gap 47, very effective to utilize the magnet 60.

From the above description, it will be understood that the lightning arrester of the embodiment of FIG. 3 operates in a manner similar to that heretofore described in connection with the embodimnet of FIGS. 1 and 2; specifically, the magnetic means 60 provides for continuous movement of an arc in the spark gap 47 and, additionally, the inverted derby-shaped electrode structure 48 is effective to provide maximum utilization of the valve material 46.

Although various illustrative embodiments of the present invention have been illustrated and described, it will be apparent to those skilled in the art that numerous changes and modifications can be made and it is, therefore, intended by the appended claims to cover all such modifications as fall within the true spirit and scope of the invention.

What is claimed as new and desired to be secured by Letters Patent of the United States is:

1. A lightning arrester comprising a housing, valve material in said housing, a first electrode of inverted cup shape having its exterior in engagement with said valve material, a second electrode concentrically spaced within said first electrode to form an annular spark gap therewith, and means connecting said second electrode, first electrode, and valve material in an electrical circuit.

2. A lightning arrester comprising a housing, valve material in said housing; a first electrode of inverted cup shape having its exterior in engagement with said valve material; a second electrode concentrically spaced within said first electrode to form an annular spark gap therewith; means connecting said second electrode, first electrode, and valve material in an electrical circuit; and means producing an axial magnetic field through said gap.

3. A lightning arrester comprising a housing closed at one end, a first electrode of inverted cup shape including a side wall and an end wall with the end wall positioned toward the closed end of said housing, a second electrode spaced within said first electrode to form a spark gap therewith, grandular valve material filling the space in said housing between said first electrode and the closed end of said housing, and means for connecting said first electrode, said second electrode, and said valve material in an electrical circuit.

4. A lightning arrester comprising a cylindrical housing closed at one end, valve material filling the closed end of said housing, a first electrode of inverted hat shape having its exterior in engagement with said valve material, a disc-shaped second electrode concentrically spaced within said first electrode to form an annular spark gap therewith, means connecting said first electrode, spark gap, second electrode, and valve material serially in an electrical circuit, and means producing an axial magnetic field through said gap.

5. A lightning arrester as set forth in claim 4 above wherein said second electrode is hollow and wherein the last-mentioned means includes a plug-shaped permanent magnet positioned in said second electrode.

6. A lightning arrester as set forth in claim 4 above wherein the last-mentioned means comprises a ring-shaped permanent magnet having poles extending axially and concentrically positioned around said first electrode.

7. A lightning arrester as set forth in claim 6 above wherein the last-mentioned means includes a pair of ring-shaped pole members positioned at opposite ends of said magnet.

8. A lightning arrester comprising a conducting casing including a cylindrical side wall closed at one end by an electrically conductive element; an insulating sleeve within said casing; grandular arrester valve material in said one end of said casing; an open inverted cup-shaped first electrode in said housing including a cylindrical side wall portion closed at one end by a bottom wall and provided with an outwardly extending ring-shaped portion at the other end, at least a portion of said side wall and bottom wall of said electrode extending into and in electrical engagement with said valve material; a disc-shaped second electrode extending at least partially within and concentrically with said first electrode and closely spaced from said portions thereof forming an annular spark gap with at least one of said portions, means for completing an electrical circuit through said spark gap between said electrodes and including said casing and said valve material serially positioned with respect to said first electrode, and magnetic means concentrically positioned with and axially aligned with said annular gap for inducing continuous arcuate motion to any arc in said gap.

9. A lightning arrester as set forth in claim 8 above wherein the last-mentioned means comprises a ring-shaped permanent magnet having poles extending axially and concentrically positioned around said first electrode.

10. A lightning arrester as set forth in claim 9 above wherein the last-mentioned means includes a pair of ring-shaped pole members positioned at opposite ends of said magnet.

11. A spark gap unit for use in a lightning arrester of the type including a housing closed at one end and having valve material filling the space in the housing adjacent the closed end; said spark gap unit comprising a first electrode of inverted cup shape including a side wall and an end wall adapted to be positioned in a housing with the end wall positioned toward the closed end of the housing against said valve material, a second electrode spaced within said first electrode to form a spark gap therewith, and means for connecting said first and second electrodes in an electrical circuit.

12. A spark gap unit for use in a lightning arrester of the type including a housing closed at one end and having valve material filling the space in the housing adjacent the closed end; said spark gap unit comprising a first electrode of inverted hat shape adapted to have its exterior in engagament with the valve material, a disc-shaped second electrode concentrically spaced within said first electrode to form an annular spark gap therewith, means connecting said first electrode, spark gap and second electrode serially in an electrical circuit, and means producing an axial magnetic field through said gap.

13. A lightning arrester as set forth in claim 12 above wherein said second electrode is hollow and wherein the last-mentioned means includes a plug-shaped permanent magnet positioned in said second electrode.

14. A lightning arrester as set forth in claim 12 above wherein the last-mentioned means comprises a ring-shaped permanent magnet having poles extending axially and concentrically positioned around said first electrode.

15. A lightning arrester as set forth in claim 14 above wherein the last-mentioned means includes a pair of ring-shaped pole members positioned at opposite ends of said magnet.

References Cited in the file of this patent

UNITED STATES PATENTS

| 2,003,954 | Pittman | June 4, 1935 |
| 2,422,324 | Watrous | June 17, 1947 |
| 2,628,322 | Yonkers | Feb. 10, 1953 |
| 2,661,439 | Stoelting | Dec. 1, 1953 |
| 2,882,433 | Jennings | Apr. 14, 1959 |
| 2,896,116 | Cunningham | July 21, 1959 |
| 2,906,922 | Huber | Sept. 29, 1959 |
| 2,963,614 | Reibs | Dec. 6, 1960 |